W. H. CARRIER.
HUMIDITY AND TEMPERATURE REGULATOR AND THE LIKE.
APPLICATION FILED APR. 14, 1915.

1,308,930.

Patented July 8, 1919.
2 SHEETS—SHEET 1.

Witnesses

Inventor.
Willis H. Carrier
by Wilhelm & Parker
Attorneys.

W. H. CARRIER.
HUMIDITY AND TEMPERATURE REGULATOR AND THE LIKE.
APPLICATION FILED APR. 14, 1915.
1,308,930.
Patented July 8, 1919.
2 SHEETS—SHEET 2.
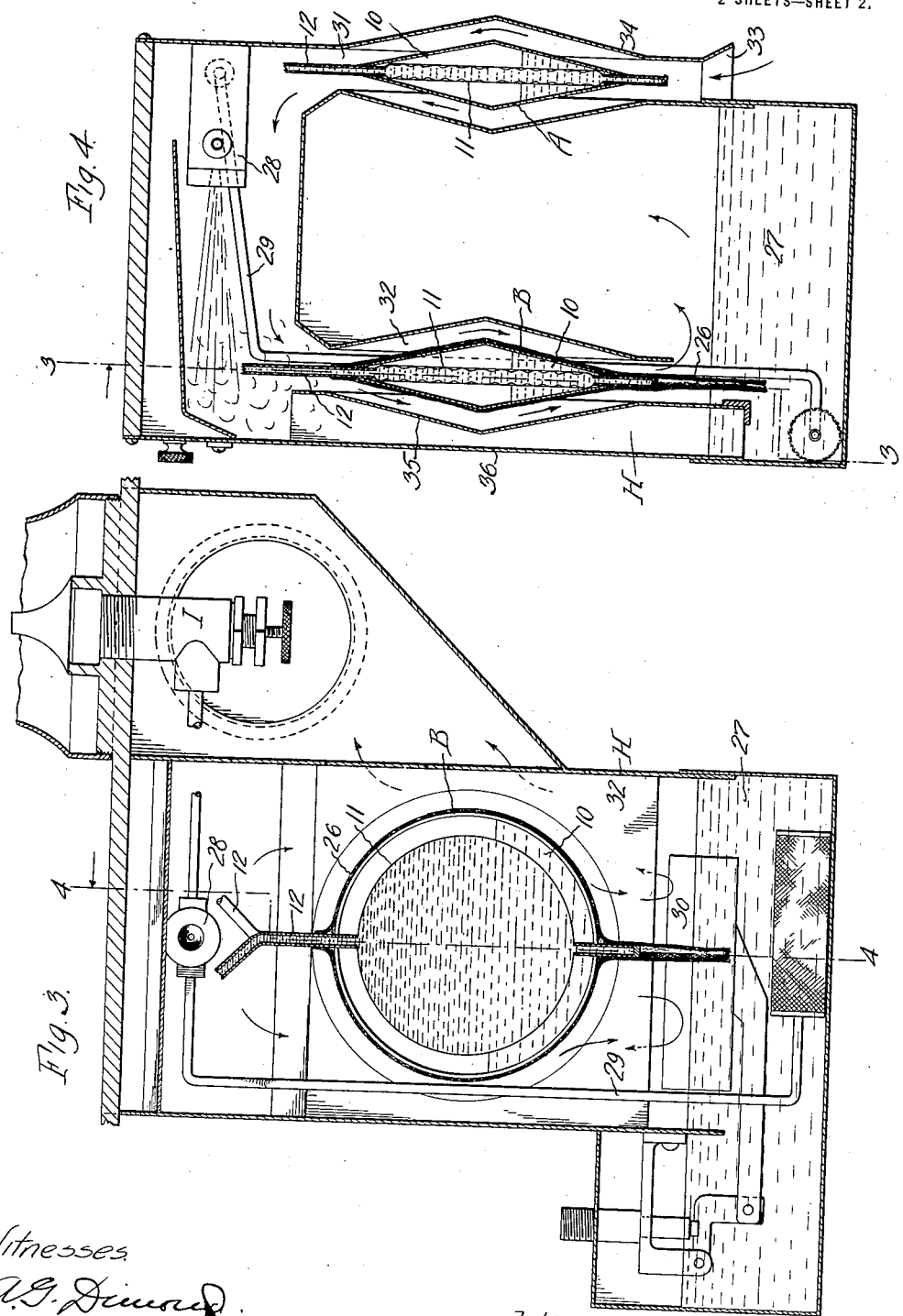

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

HUMIDITY AND TEMPERATURE REGULATOR AND THE LIKE.

1,308,930.   Specification of Letters Patent.   Patented July 8, 1919.

Application filed April 14, 1915. Serial No. 21,264.

*To all whom it may concern:*

Be it known that I, WILLIS H. CARRIER, a citizen of the United States, residing at Buffalo, in the county of Erie and State of New York, have invented a new and useful Improvement in Humidity and Temperature Regulators and the like, of which the following is a specification.

This invention relates to improvements in thermo-responsive instruments, such as humidity and temperature regulating and indicating instruments, in which the pressure of the vapor generated by a volatile liquid subjected to the temperature of the air or medium, whose humidity or temperature is to be regulated or indicated, is utilized in operating or controlling the operation of the regulating or indicating device.

One object of the invention is to improve instruments of this character so as to render their action more exact and reliable and cause the regulating or indicating device to properly respond to the changes in temperature influencing the thermoresponsive element of the instrument irrespective of the temperature affecting the motor or instrumentalities through which the vapor pressure operates or controls the operation of the regulating or indicating device.

Other objects of the invention are to so construct the instrument that the action of the motor or pressure transmitting means actuated by the vapor pressure is independent of the temperature affecting the same; and also to provide a thermoresponsive element for instruments of the character stated in which variations in the vapor pressure produce motion through the medium of a confined body of liquid independently of the expansion and contraction of said liquid due to variations in the temperature affecting the same.

In this application the invention is illustrated and described in connection with a hygrostat having vapor pressure thermoresponsive elements whose action responds respectively to the dry bulb temperature and the wet bulb temperature or temperature of evaporation of the air influencing the same, but the invention is not necessarily restricted in application to such an instrument.

In the accompanying drawings:

Fig. 3 is an enlarged longitudinal sectional elevation of the lower portion of the instrument in line 3—3, Fig. 4.

Fig. 4 is a transverse sectional elevation thereof in line 4—4, Fig. 3.

Figure 1:
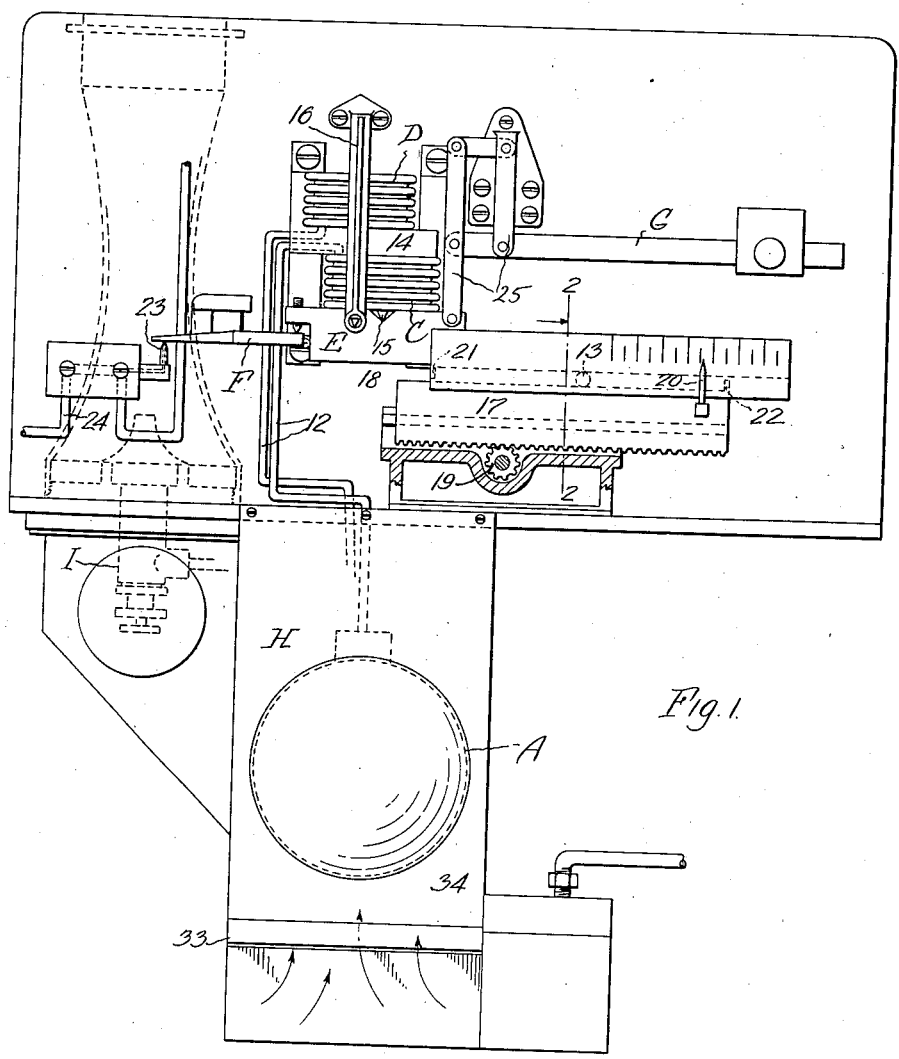
Figure 1 is an elevation, partly in section, of a humidity regulating instrument embodying the invention.
Figure 2:
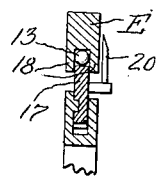
Fig. 2 is a detail section in line 2—2, Fig. 1.

A and B represent two thermoresponsive elements, one of which, A, is subjected to the dry bulb temperature of the air and the other of which, B, is subjected to the temperature of evaporation of the air. Each of these thermoresponsive elements comprises a hermetically sealed container or receptacle 10 partially filled with some suitable volatile liquid, the pressure of the vapor of which varies to a workable degree in response to changes in the temperature affecting the container, and a second bulb or container 11, preferably inclosed in the container 10, which together with a tube or conduit 12 leading therefrom for connection with a motor or diaphragm, and said motor are filled, preferably under a slight pressure, with a non-volatile liquid, such as oil. Sulfur dioxid is adapted for use in the outer container, particularly in the case of hygrometric instruments, because at ordinary atmospheric temperatures it produces a workable vapor pressure and has an ideal pressure temperature relation for controlling or indicating humidity at variable temperatures. As the outer container is only partially filled with the volatile liquid, any change in temperature affecting the container will produce a prompt corresponding change in the vapor pressure in the container. The outer container, which is preferably of circular shape and increases in width toward its central portion, has substantially rigid walls which will not give or yield appreciably under the pressure of the vapor thereon. The walls of the inner bulb or container, which may be of wafer shape, as shown, are made of thin flexible material, such, for example, as thin sheet bronze or German silver, so that these walls do not, in themselves, offer appreciable resistance to pressure and will respond readily to variations in the pressure of the vapor thereon. The vapor pressure in the outer container varies with changes in the temperature affecting the container, thereby causing a greater or lesser pressure on the walls of the inner bulb which transmit the pressure to the liquid confined in the inner bulb, tube and the motor with which the tube connects. The liquid in turn transmits this variable pressure to the motor, which thus acts in response to changes in the vapor pressure in the outer container. As the movement of the walls of the inner bulb is resisted only by the internal or external pressure thereon, the walls themselves offering no appreciable resistance to pressure, the inner bulb can expand or contract with changes in volume of the liquid therein due to changes in the temperature of the liquid, and the action of the motor in response to changes in pressure of the vapor in the outer container will not be affected by the expansion or contraction of the pressure transmitting liquid. The action of the motor will therefore not be altered by changes in temperature affecting the motor or liquid connections from the same to the thermoresponsive element, but the motor will act in response only to the changes in vapor pressure in the outer container.

C and D represent two motors or diaphragms of any suitable kind with which the tubes 12 leading from the inner bulbs of the thermoresponsive elements A and B are respectively connected. These motors act in opposition to each other on a lever or device E in such manner that unless the differential pressures of the motors on the lever E bear a predetermined relation, the lever will be moved in one or another direction, depending upon whether the ratio of the pressures increases or decreases. The lever E controls means for regulating the humidity of the air, and by making the fulcrum 13 for the lever adjustable the motors can be caused to act on the lever in accordance with one or another ratio of pressures and thus give different humidity conditions.

In the construction shown, the motors C and D are arranged on opposite sides of and bear at one end against a rigid support 14, and the free end of the motor C acts by a point 15 against the lever E, while the free end of the other motor D acts against a yoke 16 connected to the lever. The motors act on the levers at different distances from its fulcrum. The fulcrum 13 of the lever is preferably formed by a ball arranged to roll between the lower edge of the lever and an adjustable fulcrum bar 17, the rolling fulcrum 13 being confined between depending side flanges 18 on the lever. The bar 17 is adapted to be adjusted lengthwise of the lever, as by a pinion 19 engaging rack teeth on the fulcrum bar, thereby rolling the fulcrum 13 to the point required. The adjustment is indicated by a pointer 20 on the fulcrum bar coöperating with a suitably calibrated scale on the regulating lever. Stops 21 and 22 on the lever and the fulcrum bar respectively prevent the escape of the ball 13.

F represents a pivoted valve or lever which is actuated by the regulating lever E and coöperates with a bleeder port 23 for regulating the pressure of compressed air in a pipe 24 for controlling the action of means (not shown) operated by the compressed air for altering the humidity of the air which affects the thermoresponsive elements A and B. Any other suitable means for regulating humidity under the control of the regulating lever E could be employed.

G represents a weighted counterbalancing lever for the regulating lever, connected thereto by a parallel link motion 25 which permits the lever to tilt but prevents endwise movement thereof.

The thermoresponsive element B can be caused to respond to the temperature of evaporation of the air by any suitable means, such as a wick 26 which surrounds the outer container and is kept wet by dipping into water in a receptacle 27, and by water sprayed thereon by a compressed air atomizer 28 having a suction pipe 29 extending into the water receptacle 27. 30 represents a float valve for maintaining a desired level of the water in the receptacle 27. The thermoresponsive elements A and B and the wetting means for the element B are housed in a casing H, which, as shown, has an air passage 31 in which the dry bulb element A is located, and a communicating air passage 32 in which the other element is located. The passage 31 has an inlet opening 33 for the external air and the passage 32 communicates at one end with the interior of the casing, so that by exhausting air from the casing the external air is caused to circulate past the thermoresponsive elements A and B. An aspirator I communicating with the interior of the casing H is shown for exhausting the air from the casing and causing the circulation of the air past the thermoresponsive elements. The outer wall 34 of the air passage 31 is preferably made removable to afford access to the thermoresponsive element A and the outer wall 35 of the other air passage 32 is attached to and is removable with the adjacent side 36 of the casing to afford access to the other thermoresponsive element B.

I claim as my invention:

1. In an instrument of the character stated, a thermoresponsive element comprising a closed outer container of substantially fixed volume partially filled with a volatile liquid adapted to produce vapor pressure in said container which varies with normal changes in the temperature of the atmosphere affecting said container, and an inner container inclosed within said outer container and having a flexible wall exposed to the pressure of the vapor generated in said outer container, and a pressure-operated motor having a pressure chamber communicating with the interior of said inner container, said inner container, motor chamber and their connection being filled with a non-compressible pressure transmitting medium, and said flexible wall being adapted to transmit the pressure of said vapor to said pressure transmitting medium.

2. In an instrument of the character stated, a thermoresponsive element comprising a relatively thin closed outer container of substantially fixed volume partially filled with a volatile liquid adapted to produce vapor pressure in said container which varies with normal changes in the temperature of the atmosphere affecting said container, and a substantially wafer-shaped inner container inclosed within said outer container and having thin flexible walls exposed to the pressure of the vapor generated in said outer container, and a pressure-operated motor having a pressure chamber communicating with the interior of said inner container, said inner container, motor chamber and their connection being filled with a non-compressible pressure transmitting liquid, and said flexible walls being adapted to transmit the pressure of said vapor to said liquid.

3. In an instrument of the character stated, a thermoresponsive element comprising a closed outer container of substantially fixed volume partially filled with a medium adapted to produce pressure varying with normal changes in the temperature of the atmosphere affecting said container, and an inner container inclosed within said outer container and having a thin flexible wall exposed to the pressure in said outer container, and a pressure-operated motor having a pressure chamber communicating with the interior of said inner container, said inner container, motor chamber and their connection being filled with a non-compressible pressure transmitting liquid, said flexible wall being adapted to transmit the pressure of the vapor to said liquid.

4. In an instrument of the character stated, a thermoresponsive element comprising a relatively thin closed outer container of substantially fixed volume partially filled with a volatile liquid adapted to produce vapor pressure in said container which varies with normal changes in the temperature of the atmosphere affecting said container, and a substantially wafer-shaped inner container inclosed within said outer container and having thin flexible walls exposed to the pressure of the vapor generated in said outer container, a wet wick covering said outer container whereby it is subjected to the temperature of evaporation of the atmosphere, and a pressure-operated motor having a pressure chamber communicating with the interior of said inner container, said inner container, motor chamber and their connection being filled with a non-compressible pressure transmitting liquid, and said flexible walls being adapted to transmit the pressure of said vapor to said liquid.

5. The combination of two thermoresponsive elements each comprising a closed outer container of substantially fixed volume containing a medium which produces pressure in said container varying with normal changes in the temperature of the atmosphere affecting said element, and an inner container inclosed within said outer container and having a wall exposed to and adapted to be moved by the pressure in said outer container, said inner container being filled with a non-compressible pressure transmitting liquid, means whereby one of said elements is subjected to the temperature of evaporation of the air, a movable device, and means for causing the pressure transmitting liquids of said two elements to act in opposition to each other on said movable device.

6. The combination of two thermoresponsive elements each comprising a closed outer container having substantially rigid walls and partially filled with a volatile liquid adapted to produce vapor pressures varying with normal changes in the temperature of the atmosphere affecting said element, and an inner container inclosed within said outer container and filled with a non-compressible pressure transmitting liquid and having a flexible wall exposed to the vapor pressure in said outer container and adapted to transmit the pressure of the vapor in the outer container to said liquid in the inner container, means whereby one of said elements is subjected to the temperature of evaporation of the atmosphere, a movable device, and means for causing said pressure transmitting liquids of said two elements to act in opposition to each other on said movable device.

Witness my hand this 12th day of April, 1915.

WILLIS H. CARRIER.

Witnesses:
HOWARD C. RICE,
CARLOS CEBRIAN.